(12) United States Patent  (10) Patent No.: US 9,751,264 B2
Salamon                    (45) Date of Patent:     Sep. 5, 2017

(54) THERMAL INTERFACE DEVICE

(75) Inventor: Todd R. Salamon, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2296 days.

(21) Appl. No.: 12/577,148

(22) Filed: Oct. 9, 2009

(65) Prior Publication Data

US 2011/0086196 A1    Apr. 14, 2011

(51) Int. Cl.
F28F 7/00   (2006.01)
B29C 70/58  (2006.01)
B29L 31/18  (2006.01)

(52) U.S. Cl.
CPC ...... *B29C 70/58* (2013.01); *B29K 2995/0013* (2013.01); *B29L 2031/18* (2013.01); *Y10T 428/23* (2015.01)

(58) Field of Classification Search
USPC ............ 165/104.11, 104.13, 104.15, 104.18, 165/104.19, 185; 428/131, 317.9; 442/44, 58; 361/704
See application file for complete search history.

(56) References Cited

U.S. PATENT DOCUMENTS

| | | | | |
|---|---|---|---|---|
| 4,057,101 A * | 11/1977 | Ruka et al. | ................ | 165/185 |
| 4,602,678 A * | 7/1986 | Fick | ................ | 165/79 |
| 5,094,769 A | 3/1992 | Anderson, Jr. | | |
| 5,561,590 A * | 10/1996 | Norell et al. | ................ | 361/704 |
| 5,783,862 A * | 7/1998 | Deeney | ................ | 257/714 |
| 6,046,907 A * | 4/2000 | Yamaguchi | ................ | 361/704 |
| 6,150,195 A * | 11/2000 | Chiu et al. | ................ | 438/118 |
| 6,404,634 B1 * | 6/2002 | Mann | ................ | 361/704 |
| 6,482,520 B1 | 11/2002 | Tzeng | | |
| 6,605,238 B2 | 8/2003 | Nguyen | | |
| 6,919,504 B2 | 7/2005 | McCutcheon | | |
| 7,013,965 B2 | 3/2006 | Zhong | | |
| 7,399,919 B2 | 7/2008 | McCutcheon | | |
| 2005/0250250 A1 * | 11/2005 | Sung | ................ | 438/122 |
| 2005/0255304 A1 | 11/2005 | Brink | | |

(Continued)

OTHER PUBLICATIONS

Goodfellow webpage, Alumina Properties (Alumina (Al2O3) Material Information), Nov. 14, 2008; www.goodfellow.com/E/Alumina.HTML.*

(Continued)

*Primary Examiner* — Orlando E Aviles Bosques
(74) *Attorney, Agent, or Firm* — Jay Brown Law Firm

(57) ABSTRACT

A device including an enclosure that encapsulates a plurality of particles dispersed in a matrix material. The particles are formed of a material having substantial bulk thermal conductivity of at least about one watt per meter-Kelvin (1 W/[mK]) at a standardized measurement temperature of about 68° F. In the device, the enclosure is configured upon deformation to allow a portion of the matrix material to escape while retaining at least a portion of the particles within the enclosure. A system that includes an enclosure that encapsulates a plurality of such particles dispersed in a matrix material, the enclosure being located between first and second objects. In the system, the enclosure has through-pores communicating between an interior of the enclosure and an exterior of the enclosure, and at least a portion of the particles have diameters that are larger than a maximum diameter of the through-pores.

36 Claims, 12 Drawing Sheets

(56) References Cited

U.S. PATENT DOCUMENTS

| | | |
|---|---|---|
| 2007/0097651 A1 | 5/2007 | Canale |
| 2008/0151502 A1 | 6/2008 | Shives |
| 2009/0315173 A1 | 12/2009 | Kempers |
| 2010/0319895 A1* | 12/2010 | Chen et al. .................. 165/185 |

OTHER PUBLICATIONS

Goodfellow webpage, Silver Properties; Nov. 17, 2008; www.goodfellow.com/E/Silver.HTML.*

Thermal Conductivity of Materials—Table from www.EngineeringToolBox.com; retreived in 2013.*

Silver Properties—GoodFellow.com; Nov. 17, 2008.*

Brunschwiler et al., "Hierarchically Nested Channels for Fast Squeezing Interfaces with Reduced Thermal Resistance," 2005, 21st IEEE SEMI-THERM Symposium (8 pages).

Linderman et al., "Hierarchical Nested Surface Channels for Reduced Particle Stacking and Low-Resistance Thermal Interfaces," 2007, 23rd IEEE SEMI-THERM Symposium (8 pages).

"Thermal Interface Material Comparison: Thermal Pads vs. Thermal Grease," 2004, published on-line by Advanced Micro Devices Inc. at http://www.amd.com/us-en/assets/content_type/white_papers_and_tech_docs/26951.pdf (15 pages).

"Thermal Conductivity," (2009), published on-line at http://en.wikipedia.org/wiki/Thermal_conductivity (8 pages).

"Thermal Conductivity of Metals," (2009), published on-line at http://www.engineeringtoolbox.com/thermal-conductivity-metals-d_858.html (4 pages).

"Thermal Conductivity Unit Conductance Measured Temperature Heat," published on-line at http://www.economicexpert.com/a/Thermal:conductivity.htm (2 pages).

\* cited by examiner

THERMAL INTERFACE DEVICE

BACKGROUND OF THE INVENTION

1. Field of the Invention

This invention generally relates to thermal interface devices, systems that include thermal interface devices, and methods that include forming thermal interfaces between objects.

2. Related Art

This section introduces aspects that may help facilitate a better understanding of the invention. Accordingly, the statements of this section are to be read in this light and are not to be understood as admissions about what is prior art or what is not prior art.

Various types of devices, systems and methods for transferring thermal energy have been developed. Devices commonly referred to as "heat pipes", "heat sinks", "vapor chambers," and "heat spreaders" have been developed for the purpose of removing thermal energy from an object that has either generated or absorbed the thermal energy. Such heat pipes, heat sinks, vapor chambers and heat spreaders and the like remove the thermal energy from such an object and transfer the thermal energy elsewhere for end-use, dissipation, or other disposal. Thermal interface materials are often interposed between these devices and such objects. Despite these developments, there is a continuing need for improved devices, systems and methods capable of removing thermal energy from an object and transferring the thermal energy elsewhere.

SUMMARY

In an example, a device is provided. The device includes an enclosure, a plurality of particles, and a matrix material. The plurality of particles are formed of a material having substantial bulk thermal conductivity of at least about one watt per meter-Kelvin (1 W/[mK]) at a standardized measurement temperature of about 68° F. Further, the plurality of particles are dispersed in the matrix material and encapsulated in the enclosure. The enclosure is configured, upon deformation, to allow a portion of the matrix material to escape from the enclosure while retaining at least a portion of the plurality of particles within the enclosure.

A system is provided as a further example. The system includes an enclosure located between a first object and a second object. The enclosure has first and second exterior surfaces and encapsulates a plurality of particles formed of a material having substantial bulk thermal conductivity of at least about one watt per meter-Kelvin (1 W/[mK]) at a standardized measurement temperature of about 68° F., the particles being dispersed in a matrix material. The first object has a first object surface and the second object has a second object surface. The first exterior surface of the enclosure faces toward the first object surface and the second exterior surface of the enclosure faces toward the second object surface. The enclosure has through-pores communicating between an interior of the enclosure and an exterior of the enclosure, at least a portion of the plurality of particles having diameters being larger than a maximum diameter of the through-pores.

As another example, a method is provided. The method includes providing an enclosure encapsulating a plurality of particles formed of a material having substantial bulk thermal conductivity of at least about one watt per meter-Kelvin (1 W/[mK]) at a standardized measurement temperature of about 68° F. and being dispersed in a matrix material. The method further includes providing a first object having a first surface and a second object having a second surface. In addition, the method includes placing the enclosure between the first and second surfaces and pressing the first and second surfaces together, causing the enclosure to be deformed. The deforming causes at least a portion of the matrix material to escape from the enclosure while retaining at least a portion of the plurality of particles within the enclosure.

Other devices, methods, systems, features and advantages of the invention will be or will become apparent to one with skill in the art upon examination of the following figures and detailed description. It is intended that all such additional devices, methods, systems, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 8 is a further cross-sectional view taken along the line C-C of the device and system shown in FIG. 5.

DETAILED DESCRIPTION

Thermal greases, phase-change materials, thermal gels, thermally-conductive adhesives, solders and elastomeric pads, when used to form a thermal interface between a first object and a second object, have often provided poor thermal conductivity across the thermal interface formed between the two objects by these thermal interface materials. For example, interstices and other imperfections on an object surface facing the thermal interface may form air-filled insulating voids between the object and such a thermal interface material.

Figure 1:
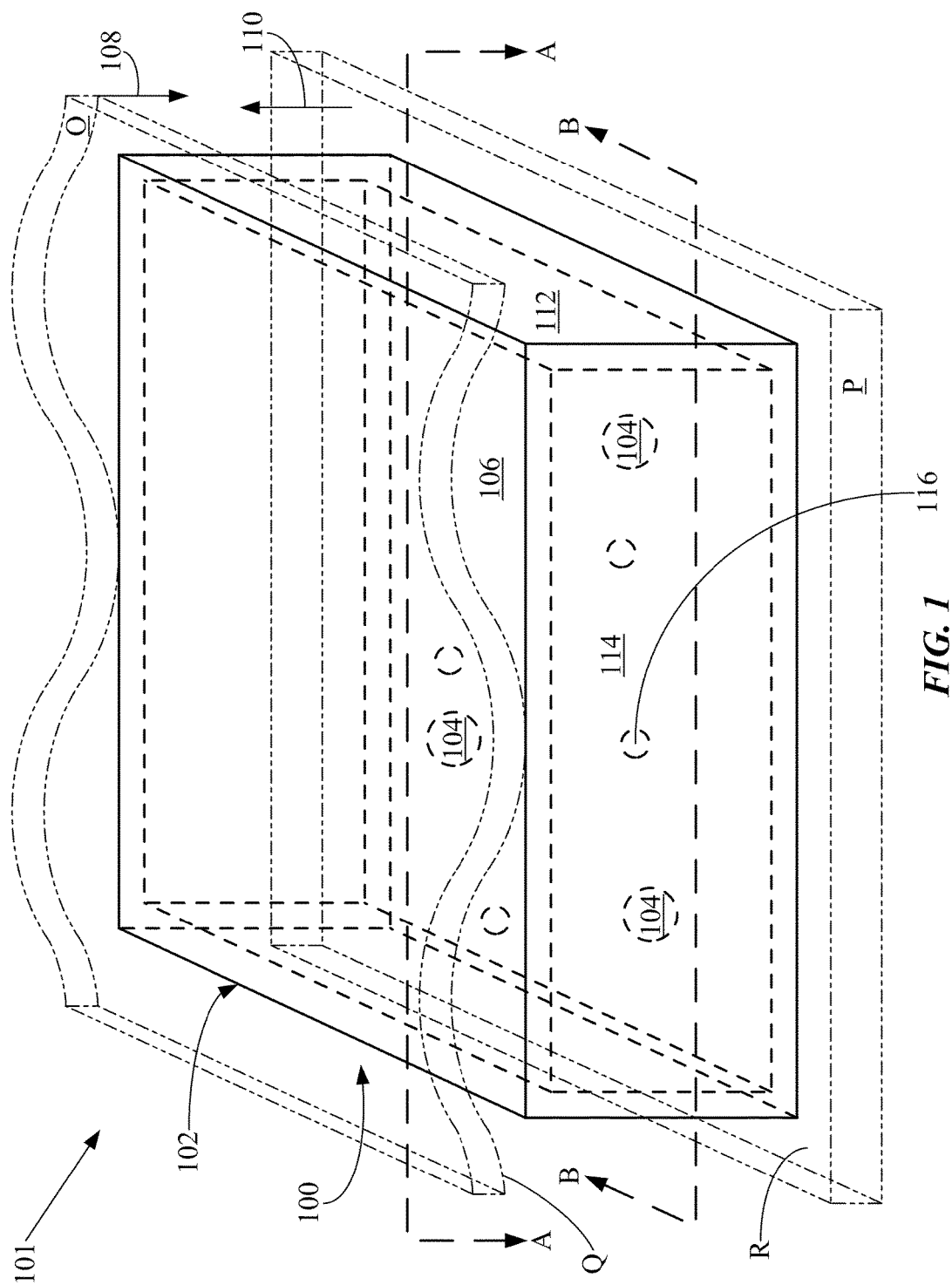
FIG. 1 is a perspective view showing an example of a device, and a system into which the device may be incorporated.
Figure 2:
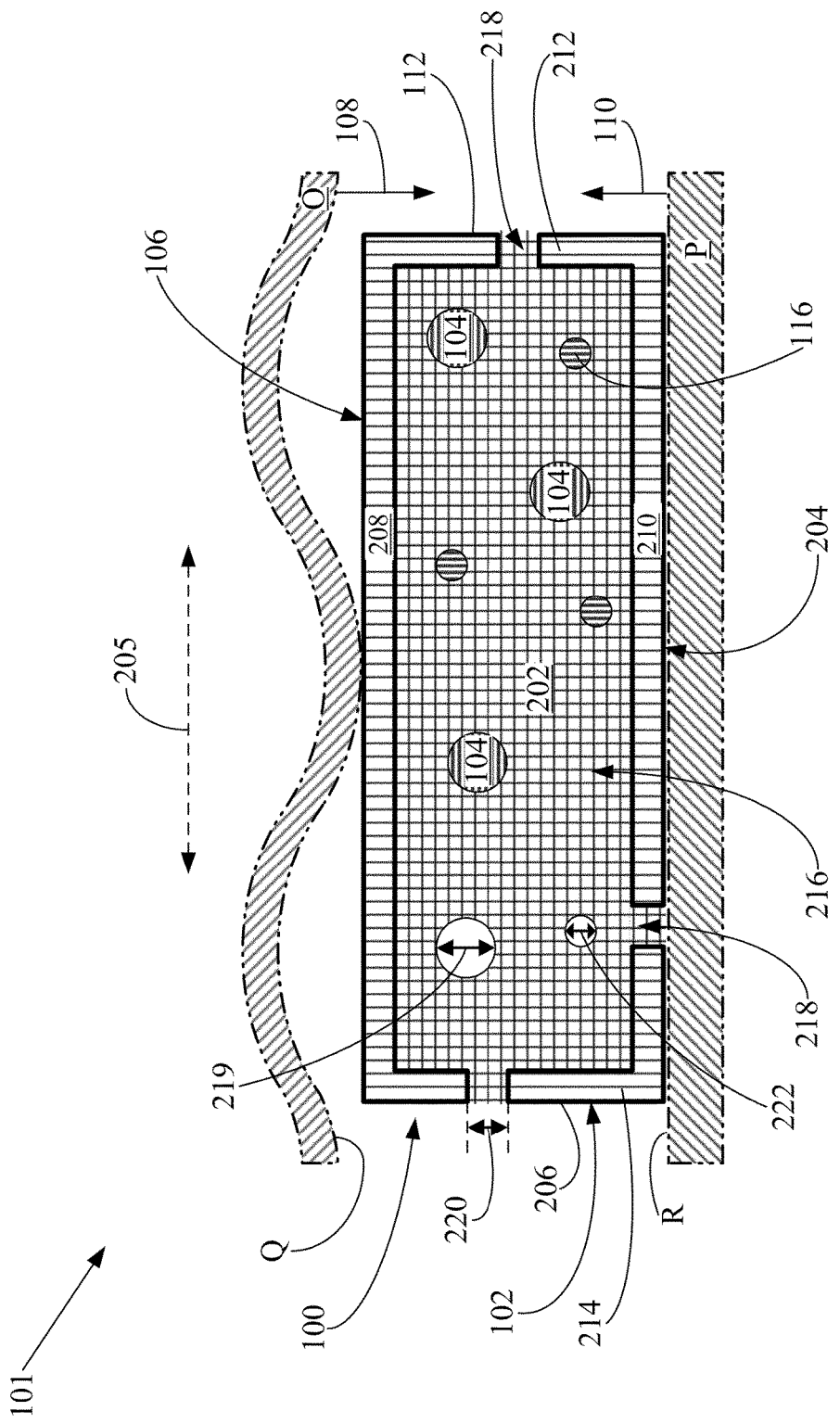
FIG. 2 is a cross-sectional view taken along line A-A of the device and system shown in FIG. 1.
Figure 3:
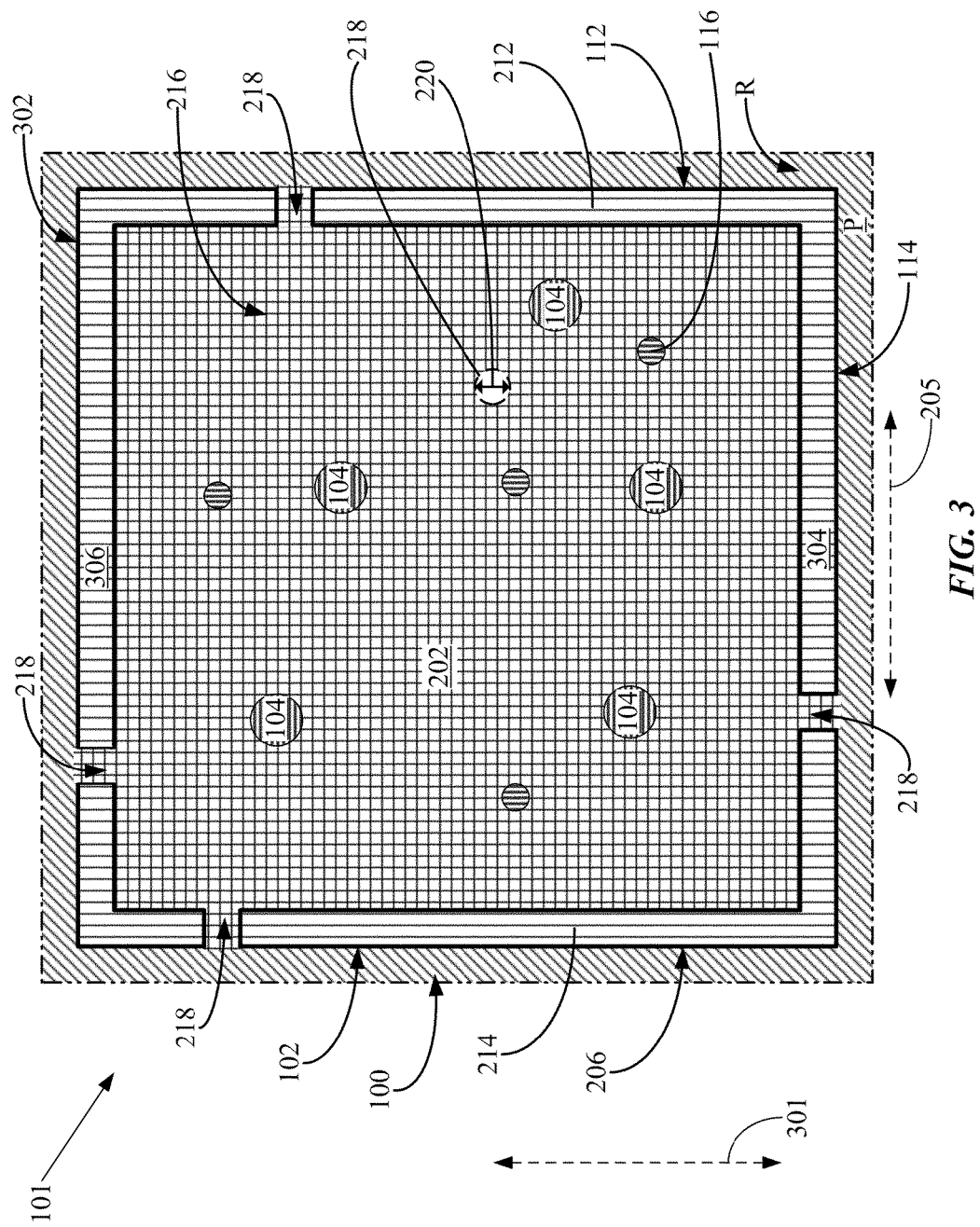
FIG. 3 is another cross-sectional view taken along the line B-B of the device and system shown in FIG. 1.
Figure 4:
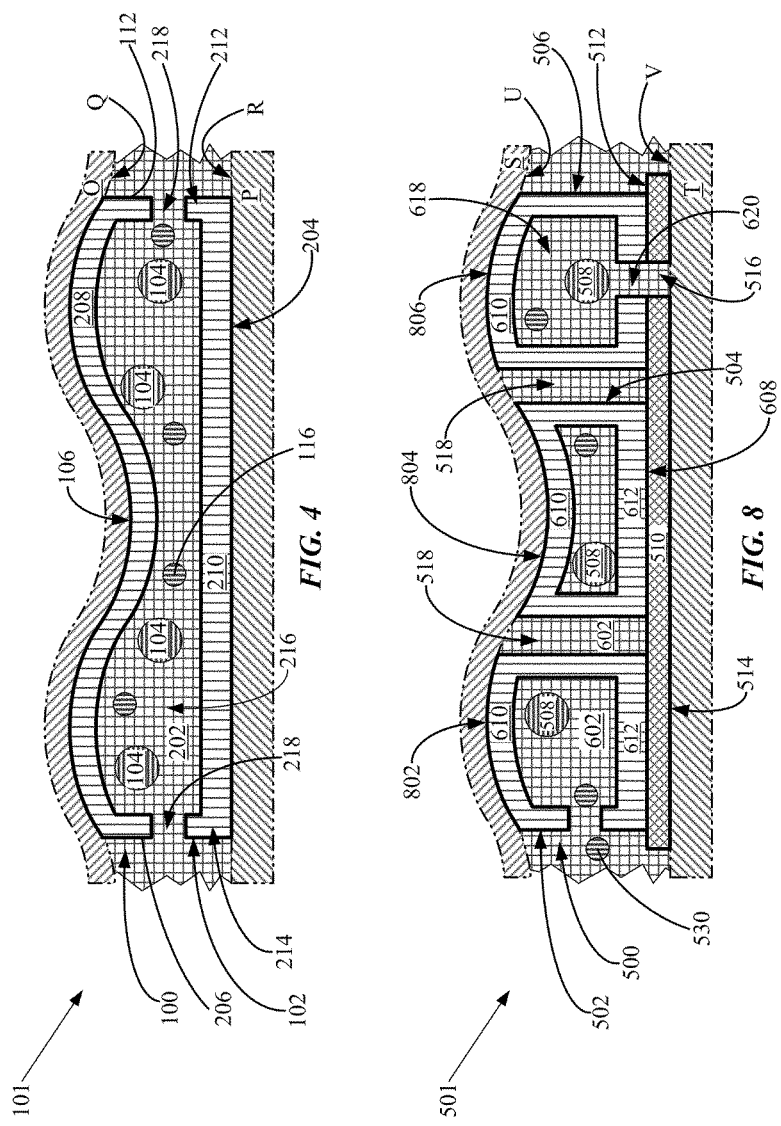
FIG. 4 is a further cross-sectional view taken along the line A-A of the device and system shown in FIG. 1.

Some thermal interface materials include a suspension of particles dispersed in a matrix material, which may provide poor particle-to-particle contact and poor control over locations and distributions of the particles in the matrix material. Further, such thermal interface materials may facilitate settling of the particles, or creeping of the particles away from their intended locations at a thermal interface. Some devices, systems and methods are provided herein that address these shortcomings. FIG. 1 is a perspective view showing an example of a device 100, and a system 101 into which the device 100 may be incorporated. FIG. 2 is a cross-sectional view taken along line A-A of the device 100 and system 101 shown in FIG. 1. FIG. 3 is another cross-sectional view taken along the line B-B of the device 100 and system 101 shown in FIG. 1. FIG. 4 is a further cross-sectional view taken along the line A-A of the device 100 and system 101 shown in FIG. 1. The device 100 includes an enclosure 102. The enclosure 102 encapsulates a matrix material 202. A plurality of particles 104 are dispersed in the matrix material 202. The particles 104 are formed of a material itself having a substantial bulk thermal conductivity of at least about one watt per meter-Kelvin (1 W/[mK]) at a standardized measurement temperature of about 68° F. In an example, the particles 104 may be formed of a material that is a thermal conductor at a standardized measurement temperature of about 68° F. As another example, the matrix material 202 having the particles 104 dispersed therein may have a substantial bulk thermal conductivity of at least about 1 W/[mK] at a standardized measurement temperature of about 68° F.

The following conventions apply regarding terminology utilized throughout this specification. When a component of a device such as the device 100, or of a system such as the system 101, is referred to as being "on" or "over" another component, then all or a portion of the component may be directly on and in contact with all or a portion of the other component, or alternatively, intervening components may also be present such that all or portions of the one component and another component "on" or "over" the one component are not mutually in direct contact. When a component is stated as being "between" two other components, then one or more additional intervening components may also be present between the two other components. When a component is referred to as being "on" or "over" another component, then the component may cover the entire surface of the other component, or may cover only a portion of the surface of the other component.

Throughout this specification, the bulk thermal conductivity k of a subject material or of a device such as the device 100 is defined as the quantity of thermal energy that passes during a unit time period through a unit surface area of the device 100 or of a plate formed of the subject material and having a unit thickness, when opposite faces of the device 100 or plate are subjected to a unit temperature difference (dT). Units for bulk thermal conductivity k may include thermal energy in British Thermal Units ("Btu"), time in hours ("hr"), temperature in degrees Fahrenheit ("° F."), surface area in square feet ("ft$^2$"), and thickness in feet ("ft"). With these units, the bulk thermal conductivity k of a material or a device 100 has units of (Btu)/[(hr)(° F.)(ft$^2$)/(ft)]. The bulk thermal conductivity k of a subject material or of a device 100 may also be converted into units of W/[(m$^2$)K/m] where ("W") is thermal energy in Watts, ("° K.") is temperature in degrees Kelvin, ("m$^2$") is surface area in square meters, and ("m") is thickness in meters. The bulk thermal conductivity k of a subject material or of a device 100 can be converted between the units of these two formulas by the expression: 1 Btu/[(hr)(° F.)(ft$^2$)/(ft)]=1.730735 W/[mK]. The bulk thermal conductivity of a material or a device 100 may vary with temperature. However, throughout this specification it is understood that the bulk thermal conductivity k of a material or of a device 100 is defined at a standardized measurement temperature of about 68° F. Throughout this specification, the term "substantial bulk thermal conductivity" means that a subject material or device 100 has a bulk thermal conductivity k of at least about one watt per meter-Kelvin (1 W/[mK]) at a standardized measurement temperature of about 68° F.

The device 100 may be utilized, for example, by being placed in between a first object O and a second object P, as illustrated in phantom outline in FIG. 1 and in solid cross-section in FIGS. 2-4. It is understood that the shapes of the first and second objects O, P are merely examples of shapes of objects, and that the devices 100 may be utilized together with objects having other shapes. A first exterior surface 106 of the device 100 may then be positioned facing toward and on a contoured first surface Q of the first object O; and a second exterior surface 204 of the device 100 may then be positioned facing toward and on a contoured second surface R of the second object P. It is understood that the contoured first and second surfaces Q, R respectively of the first and second objects O, P are merely examples of contoured first and second surfaces, and that first and second surfaces having other contours may be utilized. The first and second objects O and P may then be moved together in the directions of the arrows 108 and 110, causing the enclosure 102 to be deformed by compression between the surfaces Q, R of the first and second objects O, P. Causing the enclosure 102 to be compressed in the directions of the arrows 108 and 110 may cause the enclosure 102 to be expanded in the directions of the arrows 205, 301. FIG. 4 shows that the first exterior surface 106 of the device 100 then conforms with the contoured first surface Q of the first object O, and that the second exterior surface 204 of the device 100 then conforms with the contoured second surface R of the second object P. A thin layer (not shown) of the matrix material 202 may be present between the contoured first surface Q and the first exterior surface 106, and another thin layer (not shown) of the matrix material 202 may be present between the contoured second surface R and the second exterior surface 204. The enclosure 102 may be compressed to a different degree than shown in FIG. 4; and the compression may be uniform or non-uniform over each of the exterior surfaces 106, 204.

The device 100 may provide substantial bulk thermal conductivity of at least about 1 W/[mK] at a standardized measurement temperature of about 68° F., as an interface between the surfaces Q, R of the two objects O, P upon being compressed between and thereby being caused to conform with contours of the surfaces Q, R of the two objects O, P. In an additional example, the device 100 may be incorporated into the system 101 including the first and second objects O, P, and the enclosure 102.

Throughout this specification, it is understood that the earlier-defined bulk thermal conductivity of a device such as the device 100 is measured by establishing a unit temperature difference between a first exterior surface 106 and a second exterior surface 204 of the device 100. Throughout this specification it is understood that the earlier-defined bulk thermal conductivity of a matrix material having particles dispersed therein, such as the matrix material 202 having the particles 104 dispersed therein, is measured by establishing a unit temperature difference across two opposing exterior surfaces of a bulk sample thereof, where the opposing surfaces orient the bulk sample consistent with an orientation in the device 100 of the matrix material 202 having the particles 104 dispersed therein. Throughout this specification it is understood that the earlier-defined bulk thermal conductivity of a matrix material itself, such as the matrix material 202, is measured by establishing a unit temperature difference across two opposing exterior surfaces of a bulk sample thereof, where the opposing surfaces orient the bulk sample consistent with an orientation in the device 100 of the matrix material 202. Throughout this specification it is understood that the earlier-defined bulk thermal conductivity of particles, such as the particles 104, is measured by establishing a unit temperature difference across two opposing exterior surfaces of a bulk sample of material having the same composition as the composition from which the particles such as the particles 104 are formed.

The enclosure 102 is configured, upon deformation, to retain at least a portion of the plurality of particles 104 within the enclosure 102 while allowing at least a portion of the matrix material 202 to escape from the enclosure 102. In an example, the plurality of particles 104 may be dispersed in the matrix material 202 at a first concentration prior to deformation of the enclosure 102 by compression between the surfaces Q, R of the first and second objects O, P. The enclosure 102 may then be so deformed, causing at least a portion of the matrix material 202 to escape from the enclosure 102. The enclosure 102 may then contain an accordingly densified portion of the plurality of particles 104 being dispersed at a second concentration, greater than the first concentration, in a remaining portion of the matrix material 202.

The enclosure 102 may have further exterior surfaces 112, 114, 206 and 302, in addition to exterior surfaces 106 and 204. The enclosure 102 may also have walls 208, 210, 212, 214, 304, 306 defining a cavity 216 containing the plurality of the particles 104 dispersed in the matrix material 202. The matrix material 202 may substantially fill the cavity 216, meaning that any presence of air pockets within the cavity 216 may be minimized. The device 100 may be utilized by being placed in between a first object O and a second object P, which may then be moved together as earlier discussed. FIG. 4 shows that the wall 208 of the device 100 then conforms with the contoured first surface Q of the first object O, and that the wall 210 of the device 100 then conforms with the contoured second surface R of the second object P.

The enclosure 102, or a portion of the enclosure 102 such as one or more walls 208, 210, 212, 214, 304, 306, is flexible. Throughout this specification, the term "flexible" means that the flexible portion of a subject enclosure 102, such as one or more walls 208, 210, 212, 214, 304, 306, is suitable for being subjected to deformation as described herein, while maintaining its structural integrity.

One or more of the walls 208, 210, 212, 304, 214, 306 may have through-pores 218 communicating between an interior of the enclosure 102 such as the cavity 216, and an exterior surface 106, 204, 112, 114, 206, 302 respectively of the enclosure 102. In another example (not shown) the interior of the enclosure 102 may include a plurality of cavities defined by one or a plurality of interior walls. Throughout this specification, the term "through-pore" designates a passageway communicating through a component of a device, such as through a wall 208, 210, 212, 214, 304, 306 of the enclosure 102 in the device 100. The through-pores 218 may facilitate escape of the matrix material 202 from the enclosure 102. The walls 208, 210, 212, 214, 304, 306 of the enclosure 102 may be formed, for example, by a foam or mesh that also forms the through-pores 218.

In an example, at least a portion of the plurality of the particles 104 may have a diameter being larger than a maximum pore diameter of the through-pores 218. For example, the particles 104 may have first diameters including a range of particle diameters 219. Where the enclosure 102 includes approximately uniform through-pores 218, the through-pores 218 may have a characteristic diameter 220. In another example, the device 100 may include particles 104 having first diameters 219 including a first range of particle diameters, and particles 116 having second diameters including a second range of particle diameters 222 being smaller than the first diameters 219. The particles 104 and the particles 116 may together form a plurality of particles 104, 116 dispersed in the matrix material 202. The enclosure 102 may be configured, upon deformation of the enclosure 102, to retain a majority of the particles 104 within the enclosure 102, while allowing a portion of the particles 116 to escape from the enclosure 102.

Overall dimensions of the device 100 may include, as examples, lengths, widths and heights each being within a range of between about one-tenth (0.1) of a millimeter (mm) and about one (1) meter (m). Overall dimensions of the enclosure 102 may include, as examples, lengths, widths and heights each being within a range of between about 0.1 mm and about 1 m; or each being within a range of between about 0.1 mm and about ten millimeters (10 mm). The device 100, or the enclosure 102, may have one or more dimensions approximating a dimension of one or both of the objects O, P. The through-pores 218 may have uniform or varying shapes and/or diameters. As examples, the through-pores 218 may have cross-sections that are irregular, circular, elliptical, polygonal, square, triangular, or honeycomb. Longitudinally, the through-pores 218 may have straight or curved axes or may meander through a wall 208, 210, 212, 214, 304, 306 of the enclosure 102 in a random fashion. Dimensions of the particles 104, 116 and of the through-pores 218 may, for example, each independently have orders of magnitude in the range of hundreds of microns ($\mu$m) down to one (1) $\mu$m. The particles 104, 116 may have uniform or varying shapes and/or diameters. As examples, the particles 104, 116 may have shapes that are irregular, spherical, ellipsoid, polygonal, cubic, disc-shaped, fiber-shaped, or rhomboid. Walls 208, 210, 212, 214, 304, 306 of the enclosure 102 may have thicknesses, for example, with orders of magnitude in the range of about 200 nanometers (nm) to tens of $\mu$m; or as great as one (1) mm or more.

The particles 104, 116 may generally be formed of any material having substantial bulk thermal conductivity of at least about 1 W/[mK] at a standardized measurement temperature of about 68° F. Further, for example, the particles 104, 116 may be formed of a material being solid at operating temperatures to which the device 100 is to be subjected during end-utilization. For example, operating temperatures for the devices 100 may be within a range of between about ambient atmospheric temperature such as about 21° C., and about 400° C. or more.

As examples, the particles 104, 116 may be formed of a material having a composition including one or more of the following: metals, metal oxides, metal carbides, metal nitrides, fiberglass, graphite, carbon black, carbon fibers, carbon nanotubes, diamond, diamond powder, ceramics, mica, quartz, other minerals, trimethylated silica, inorganic glasses such as borosilicates, gallium arsenide, other inorganic dielectrics including Group III-V semiconductors as examples, other refractory materials, boron compounds such as boric oxide, boron nitride and boron phosphide, barium chloride, calcium fluoride, high temperature polymers, and liquid crystal polymers. Metals that may be utilized include, as examples: aluminum, beryllium, copper, indium, magnesium, rhodium, sodium, titanium, zirconium, chromium, molybdenum, tungsten, iron, nickel, palladium, platinum, silver, gold, zinc, tin, lead, silicon, and alloys including two or more of the foregoing. Examples of alloys include brass, and copper/molybdenum. The particles 104, 116 may further include carbon nanotubes.

The enclosure 102 may generally be formed of any material capable of being shaped into an enclosure 102 having structural integrity at operating temperatures for the device 100. The enclosure 102 may be formed of one uniform material, or portions of the enclosure 102 such as one or more walls 208, 210, 212, 214, 304, 306, may be formed of different materials. For example, a portion of the enclosure 102 such as one or more walls 208, 210, 212, 214, 304, 306 may be formed of a flexible material, and another portion of the enclosure 102 may be formed of a less flexible, more rigid material. The enclosure 102 may be formed of such a composition structured as a wire mesh or foam, for example. Further, the enclosure 102 or a portion of the enclosure 102 such as one or more of the walls 208, 210, 212, 214, 304, 306, may be formed of such a material selected as having substantial bulk thermal conductivity of at least about 1 W/[mK] at a standardized measurement temperature of about 68° F. As examples, the enclosure 102 may be formed of a composition including one or more of the following: metals, metal oxides, metal carbides, metal nitrides, fiberglass, graphite, carbon black, carbon fibers, carbon nanotubes, diamond, diamond powder, ceramics, mica, quartz, other minerals, trimethylated silica, inorganic glasses such as borosilicates, gallium arsenide, other inorganic dielectrics including Group III-V semiconductors as examples, other refractory materials, boron compounds such as boric oxide, boron nitride and boron phosphide, barium chloride, calcium fluoride, high temperature polymers, and liquid crystal polymers. Metals that may be utilized include, as examples: aluminum, beryllium, copper, indium, magnesium, rhodium, sodium, titanium, zirconium, chromium, molybdenum, tungsten, iron, nickel, palladium, platinum, silver, gold, zinc, tin, lead, silicon, and alloys including two or more of the foregoing. Examples of alloys include brass, and copper/molybdenum.

The matrix material 202 may have a composition being initially in a liquid or gel state and suitable for being caused to escape from the enclosure 102 upon deformation of the enclosure 102 as earlier discussed. As an example, the matrix material 202 may initially be a gel or a liquid having a high viscosity, suitable for being retained within the enclosure 102 prior to its deformation. Further, the matrix material 202 may have a composition suitable for being converted from liquid or gel-like form to a more firm, more solid, or rigid form after causing a portion of the matrix material 202 to escape from the enclosure 102. Additionally, the matrix material 202 may be formed of a composition having substantial bulk thermal conductivity of at least about 1 W/[mK] at a standardized measurement temperature of about 68° F. As a further example, the matrix material 202 may include a curable or thixotropic liquid or gel-like composition. Such a curable or thixotropic composition may be heat-resistant. Curable liquid and gel-like compositions included in the matrix material 202 may be cured after deformation of the enclosure 102 as earlier discussed. For example, the matrix material 202 may include a curable liquid or gel-like composition capable of forming a solid cross-linked matrix structure. Such a curable liquid or gel-like composition may include a thermosetting polymer, as an example. Thermoplastic polymers may also be utilized. Thixotropic liquid and gel-like compositions included in the matrix material 202 may be caused to thicken by being subjected to compression and shear forces during deformation of the enclosure 102 as earlier discussed. The matrix material 202 may further have a composition initially being suitable for adequately wetting the surfaces Q, R of the two objects O, P so that interfaces having low thermal resistance may be formed between the exterior surfaces 106, 204 of the enclosure 102 and the first and second surfaces Q, R, respectively, of the objects O, P. Suitable materials that may be utilized in forming the composition of the matrix material 202 include, as examples: silicone fluids, silicone elastomers, and silicone resins; heat-curable and ultraviolet light-curable epoxides; acrylates; pressure-sensitive adhesives; waxes; polyolefins; thermal greases; mineral oils; and sol-gels such as methyltrimethoxysilane and octamethyltrisiloxane.

In an example, the matrix material 202 may itself have a bulk thermal conductivity of less than about 0.5 W/[mK] at a standardized measurement temperature of about 68° F. In a further example, the matrix material 202 may itself have a bulk thermal conductivity of less than about 3 W/[mK] at a standardized measurement temperature of about 68° F. As an additional example, the particles 104 may be formed of a material itself having substantial bulk thermal conductivity of at least about 10 W/[mK] at a standardized measurement temperature of about 68° F. As another example, the particles 104 may be formed of a material itself having a bulk thermal conductivity that is at least about 0.5 W/[mK] greater than a bulk thermal conductivity of the matrix material 202 itself, both bulk thermal conductivities being defined at a standardized measurement temperature of about 68° F.

Figure 5:
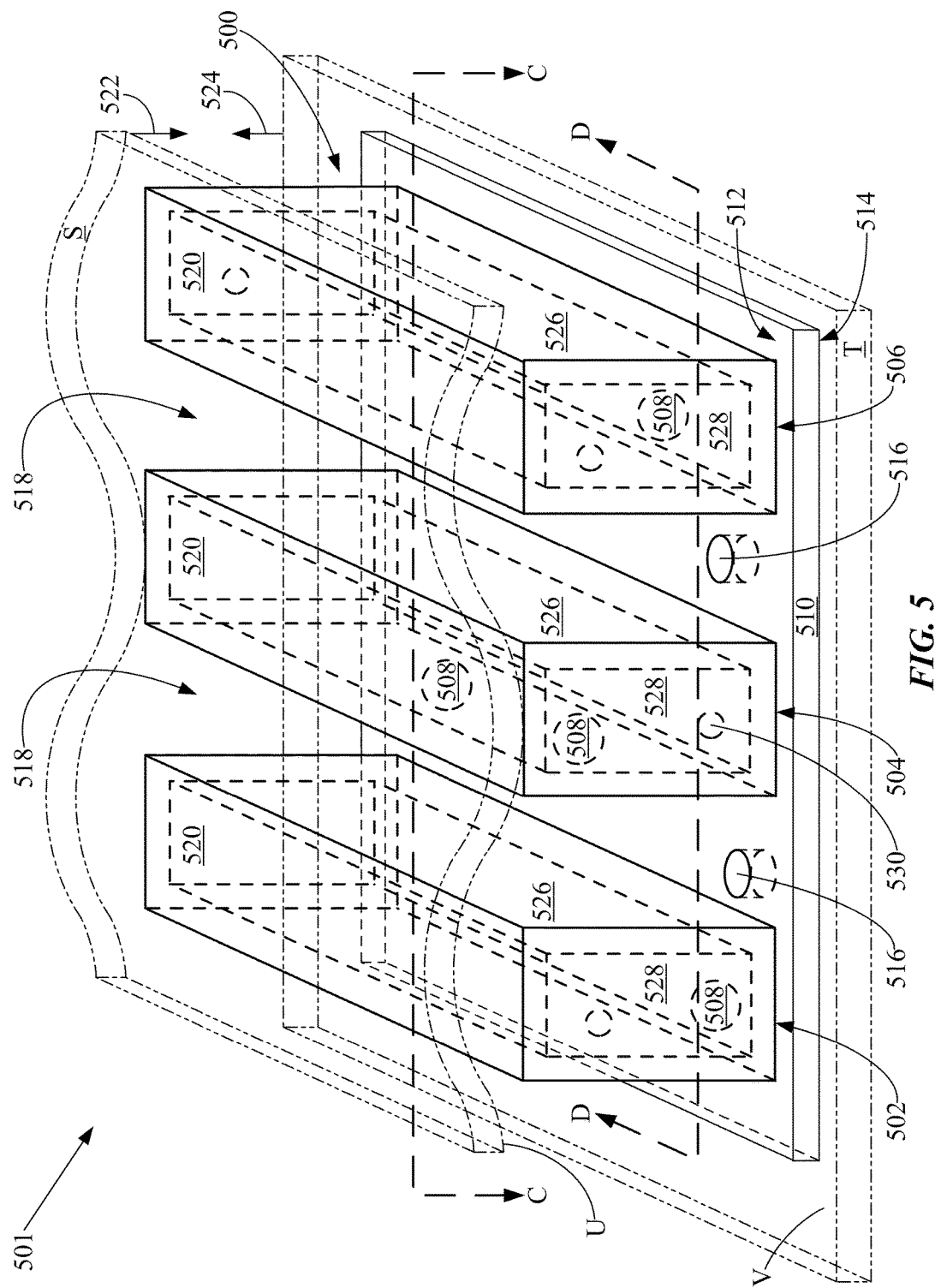
FIG. 5 is a perspective view showing another example of a device, and a system into which the device may be incorporated.
Figure 6:
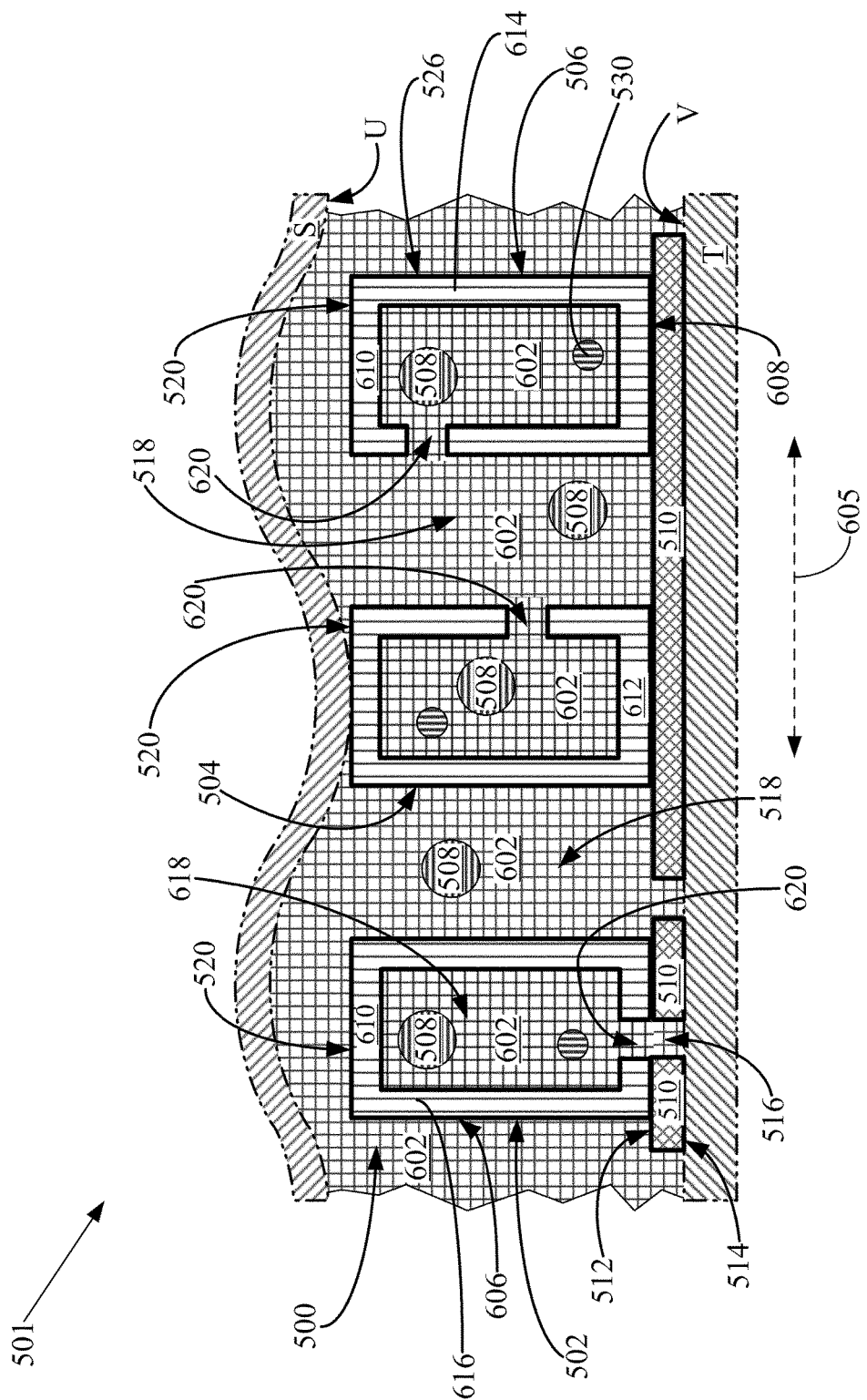
FIG. 6 is a cross-sectional view taken along line C-C of the device and system shown in FIG. 5.
Figure 7:
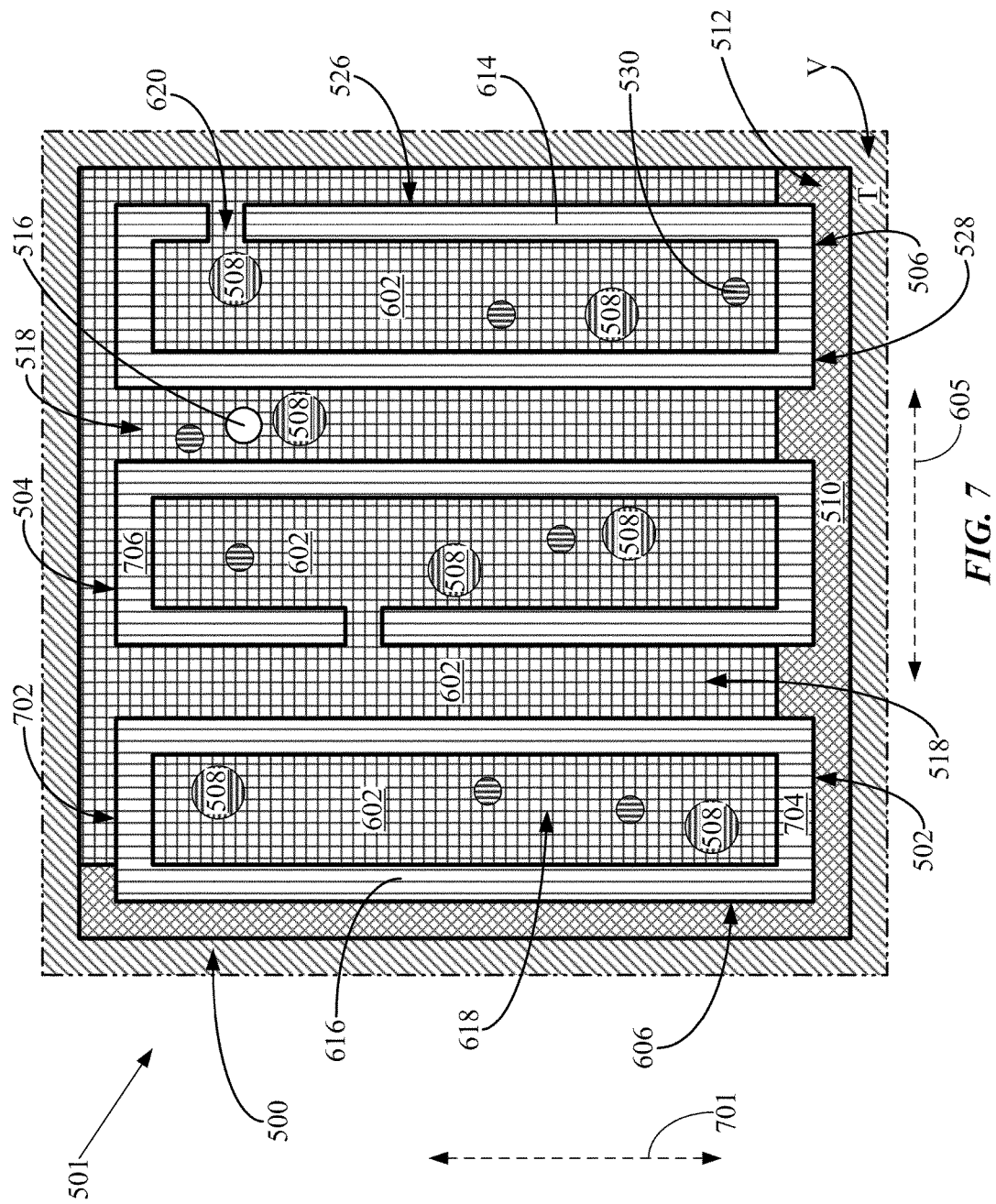
FIG. 7 is another cross-sectional view taken along line D-D of the device and system shown in FIG. 5.

FIG. 5 is a perspective view showing another example of a device 500, and a system 501 into which the device 500 may be incorporated. FIG. 6 is a cross-sectional view taken along line C-C of the device 500 and system 501 shown in FIG. 5. FIG. 7 is another cross-sectional view taken along line D-D of the device 500 and system 501 shown in FIG. 5. FIG. 8 is a further cross-sectional view taken along the line C-C of the device 500 and system 501 shown in FIG. 5. The device 500 includes a plurality of enclosures 502, 504, 506. Each of the enclosures 502, 504, 506 encapsulates a matrix material 602. A plurality of particles 508 are dispersed in the matrix material 602. The particles 508 are formed of a material having substantial bulk thermal conductivity of at least about 1 W/[mK] at a standardized measurement temperature of about 68° F. In an example, the particles 508 may be formed of a material that is a thermal conductor at a standardized measurement temperature of about 68° F. As another example, the matrix material 602 having the particles 508 dispersed therein may have a substantial bulk thermal conductivity of at least about 1 W/[mK] at a standardized measurement temperature of about 68° F. In an example, the matrix material 602 may itself have a bulk thermal conductivity of less than about 0.5 W/[mK] at a standardized measurement temperature of about 68° F. In a further example, the matrix material 602 may itself have a bulk thermal conductivity of less than about 3 W/[mK] at a standardized measurement temperature of about 68° F. As an additional example, the particles 104 may be formed of a material itself having substantial bulk thermal conductivity of at least about 10 W/[mK] at a standardized measurement temperature of about 68° F. As another example, the particles 508 may be formed of a material itself having a bulk thermal conductivity that is at least about 0.5 W/[mK] greater than a bulk thermal conductivity of the matrix material 602 itself, both bulk thermal conductivities being defined at a standardized measurement temperature of about 68° F.

The enclosures 502, 504, 506 are located on a base 510. The base 510 may have opposing first and second surfaces 512, 514. Further, the base 510 may have through-pores 516 communicating between the opposing first and second surfaces 512, 514 of the base 510. In examples, the base 510 may be formed by a foam or mesh that also forms the through-pores 516.

The plurality of enclosures 502, 504, 506 may include any selected quantity of enclosures 502, 504, 506. The plurality of enclosures 502, 504, 506 may be arranged in an array located on the base 510. In the array, the plurality of enclosures 502, 504, 506 may be mutually spaced apart on the base 510 as shown, or may be (not shown) in mutual contact. In an example, the plurality of enclosures 502, 504, 506 as arranged in such an array may each have an elongated parallelepiped shape as shown, wherein the array forms channels 518 between the enclosures 502, 504, 506 on the base 510. The device 500 may include further matrix material 602 being located on the base 510 surrounding and in between the enclosures 502, 504, 506. The further matrix material 602 may include a further plurality of particles 508 being formed of a material having a substantial bulk thermal conductivity of at least about 1 W/[mK] at a standardized measurement temperature of about 68° F. In addition to the plurality of enclosures 502, 504, 506 being located on the first surface 512 of the base 510, the device 500 may further include (not shown) a plurality of enclosures being located on the second surface 514 of the base 510. The enclosures 502, 504, 506 being located on the first surface 512 may be separate from, integral with, or communicate via through-pores 516 with the plurality of enclosures (not shown) located on the second surface 514 of the base 510.

The device 500 may be utilized, for example, by being placed in between a first object S and a second object T, as illustrated in phantom outline in FIG. 5 and in solid cross-section in FIGS. 6-8. It is understood that the shapes of the first and second objects S, T are merely examples of shapes of objects, and that the devices 500 may be utilized together with objects having other shapes. First exterior surfaces 520 of the enclosures 502, 504, 506 may be positioned facing toward a contoured first surface U of the first object S. Second exterior surfaces 608 of the enclosures 502, 504, 506 may be positioned facing toward a contoured second surface V of the second object T. The base 510 may be positioned between the second exterior surfaces 608 and the second object T, with the second surface 514 of the base 510 being on the contoured second surface V. It is understood that the contoured first and second surfaces U, V respectively of the first and second objects S, T are merely examples of contoured first and second surfaces, and that surfaces having other contours may be utilized. The first and second objects S and T may then be moved together in the directions of the arrows 522 and 524, causing the enclosures 502, 504, 506 to be deformed by compression between the surfaces U, V of the first and second objects S, T. Causing the enclosures 502, 504, 506 to be compressed in the directions of the arrows 522, 524 may cause the enclosures 502, 504, 506 to be expanded in the directions of the arrows 605, 701.

FIG. 8 shows that the first exterior surfaces 520 of the plurality of enclosures 502, 504, 506 in the device 500 are then deformed into first exterior surfaces 802, 804, 806 that conform with the contoured first surface U of the first object S, and that the second surface 514 of the base 510 in the device 500 then conforms with the contoured second surface V of the second object T. A thin layer (not shown) of the matrix material 602 may be present between the contoured first surface U and the first exterior surfaces 802, 804, 806, and another thin layer (not shown) of the matrix material 602 may be present between the contoured second surface V and the second surface 514 of the base 510. The enclosures 502, 504, 506 may be compressed to a different degree than shown in FIG. 8; and the compression may be uniform or non-uniform over each of the first exterior surfaces 520 of the enclosures 502, 504, 506 and over the second surface 514 of the base 510.

The device 500 may provide substantial bulk thermal conductivity of at least about 1 W/[mK] at a standardized measurement temperature of about 68° F. as an interface between the surfaces U, V of the two objects S, T upon being compressed between and thereby being caused to conform with contours of the surfaces U, V of the two objects S, T. In an additional example, the device 500 may be incorporated into the system 501 including the first and second objects S, T and the enclosures 502, 504, 506.

The base 510 may be flexible or rigid, as examples. A base 510 formed of a wire mesh, for example, may conform to contours of the surfaces U, V of the two objects S, T yet may be dimensionally stable in directions of the arrows 605, 701.

The enclosures 502, 504, 506 are configured, upon deformation, to retain at least a portion of the plurality of the particles 508 within the enclosures 502, 504, 506 while allowing at least a portion of the matrix material 602 to escape from the enclosures 502, 504, 506. In an example, a plurality of the particles 508 may be dispersed in the matrix material 602 in each of the plurality of enclosures 502, 504, 506 at a first concentration, prior to deformation of the enclosures 502, 504, 506 by compression between the surfaces U, V of the first and second objects S, T. The enclosures 502, 504, 506 may then be so deformed, causing at least a portion of the matrix material 602 to escape from some or all of the enclosures 502, 504, 506. Some or all of the enclosures 502, 504, 506 may then each contain an accordingly densified portion of the plurality of the particles 508 being dispersed at a second concentration, greater than the first concentration, in a remaining portion of the matrix material 602. The channels 518, where included in the device 500, may facilitate and guide flows of the matrix material 602, and may facilitate mutual alignment among the particles 508.

Each of the enclosures 502, 504, 506 may have further exterior surfaces 526, 528, 606, 608, and 702, in addition to the first exterior surface 520. Each of the enclosures 502, 504, 506 may also have walls 610, 612, 614, 616, 704, 706 defining a cavity 618 containing the plurality of the particles 508 dispersed in the matrix material 602. The matrix material 602 may substantially fill the cavity 618, meaning that any presence of air pockets within the cavity 618, which could potentially reduce thermal conductivity through the device 500, may be minimized. The device 500 may be utilized by being placed in between a first object S and a second object T, and the objects S and T may then be moved together as earlier discussed. FIG. 8 shows that the exterior surfaces 802, 804, 806 of the walls 610 of the enclosures 502, 504, 506 in the device 500 then conform with the contoured first surface U of the first object S, and that the walls 612 of the enclosures 502, 504, 506 in the device 500 then conform with the contoured second surface V of the second object T.

One or more of the walls 610, 612, 614, 616, 704, 706 may have one or a plurality of through-pores 620 each communicating between an interior of the enclosures 502, 504, 506 such as the cavity 618, and an exterior surface 520, 608, 526, 606, 528, 702 respectively of the enclosures 502, 504, 506. In another example (not shown) the interior of an enclosure 502, 504, 506 may include a plurality of cavities defined by one or a plurality of interior walls. The through-pores 620 may facilitate escape of the matrix material 602 from the enclosures 502, 504, 506. The walls 610, 612, 614, 616, 704, 706 of the enclosures 502, 504, 506 may be formed, for example, by a foam or mesh that also forms the through-pores 620. The particles 508 and the through-pores 620 may have diameters, including multiple average diameters and multiple diameter ranges, varying in the same manner as earlier discussed in connection with the particles 104 and 116 and the through-pores 218 in the device 100. For example, the device 500 may include particles 530 being smaller than the particles 508. The device 500, particles 508, 530, and enclosures 502, 504, 506 may have similar dimensions and be formed of the same materials as earlier discussed in connection with analogous components of the device 100. The matrix material 602 may formed of the same materials as earlier discussed in connection with analogous components of the device 100. The enclosures 502, 504, 506 included in the device 500 may have one or more dimensions being smaller than a dimension of one or both of the objects S, T. These relatively smaller dimensions of the enclosures 502, 504, 506 may facilitate compliance of the enclosures 502, 504, 506 with interstices and other imperfections in the surfaces U, V of the objects S, T.

Figure 9:
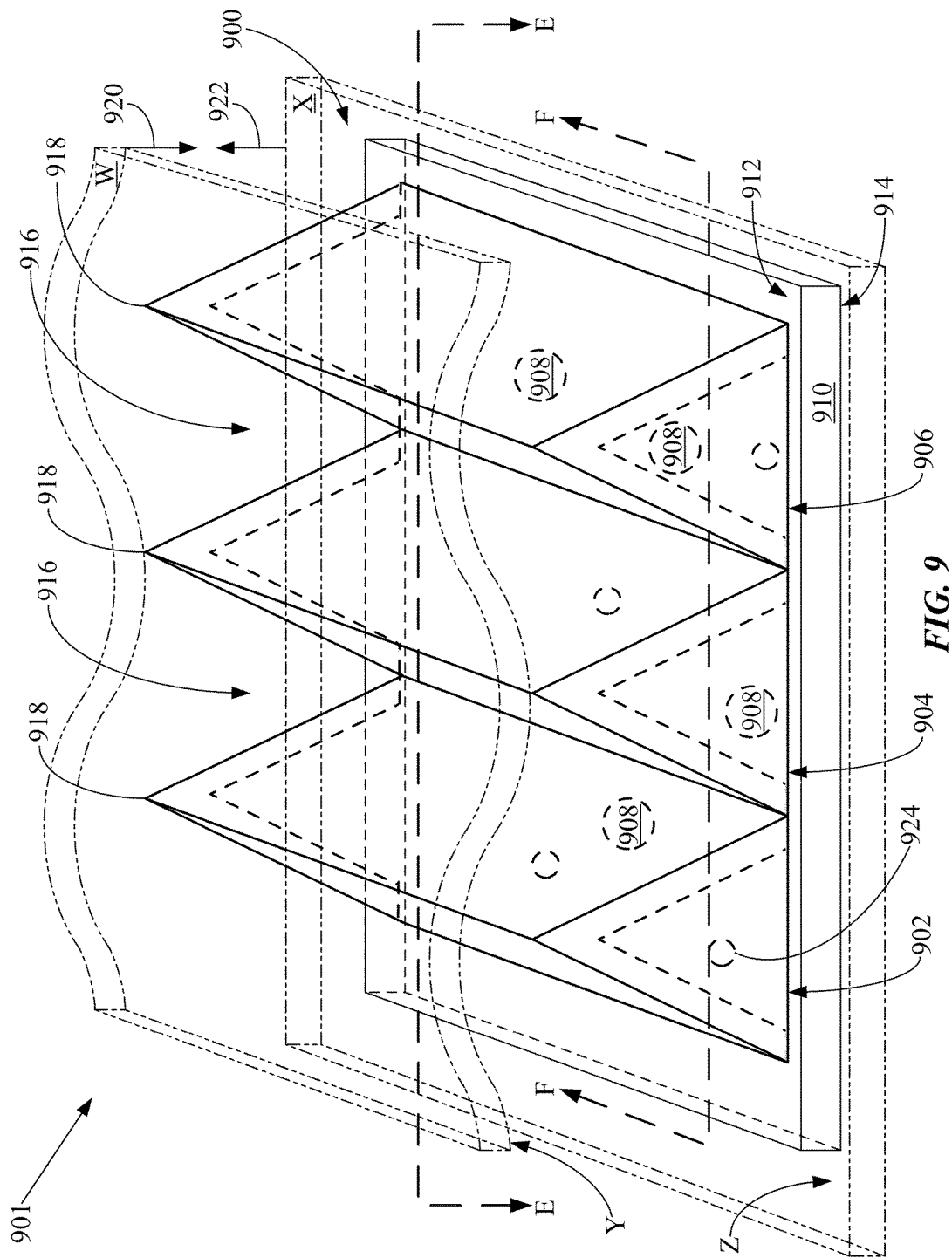
FIG. 9 is a perspective view showing a further example of a device, and a system into which the device may be incorporated.
Figure 10:
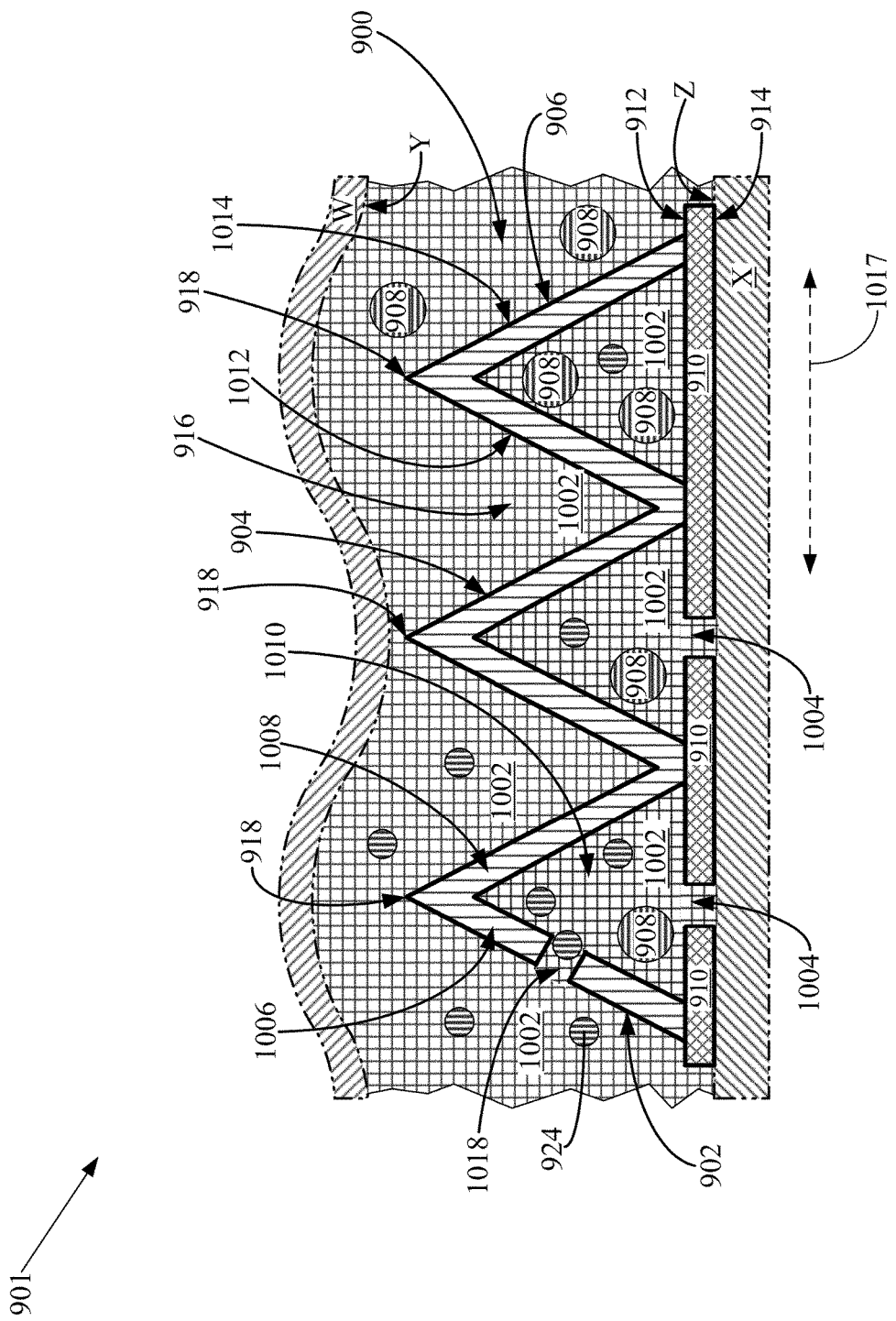
FIG. 10 is a cross-sectional view taken along line E-E of the device and system shown in FIG. 9.
Figure 11:
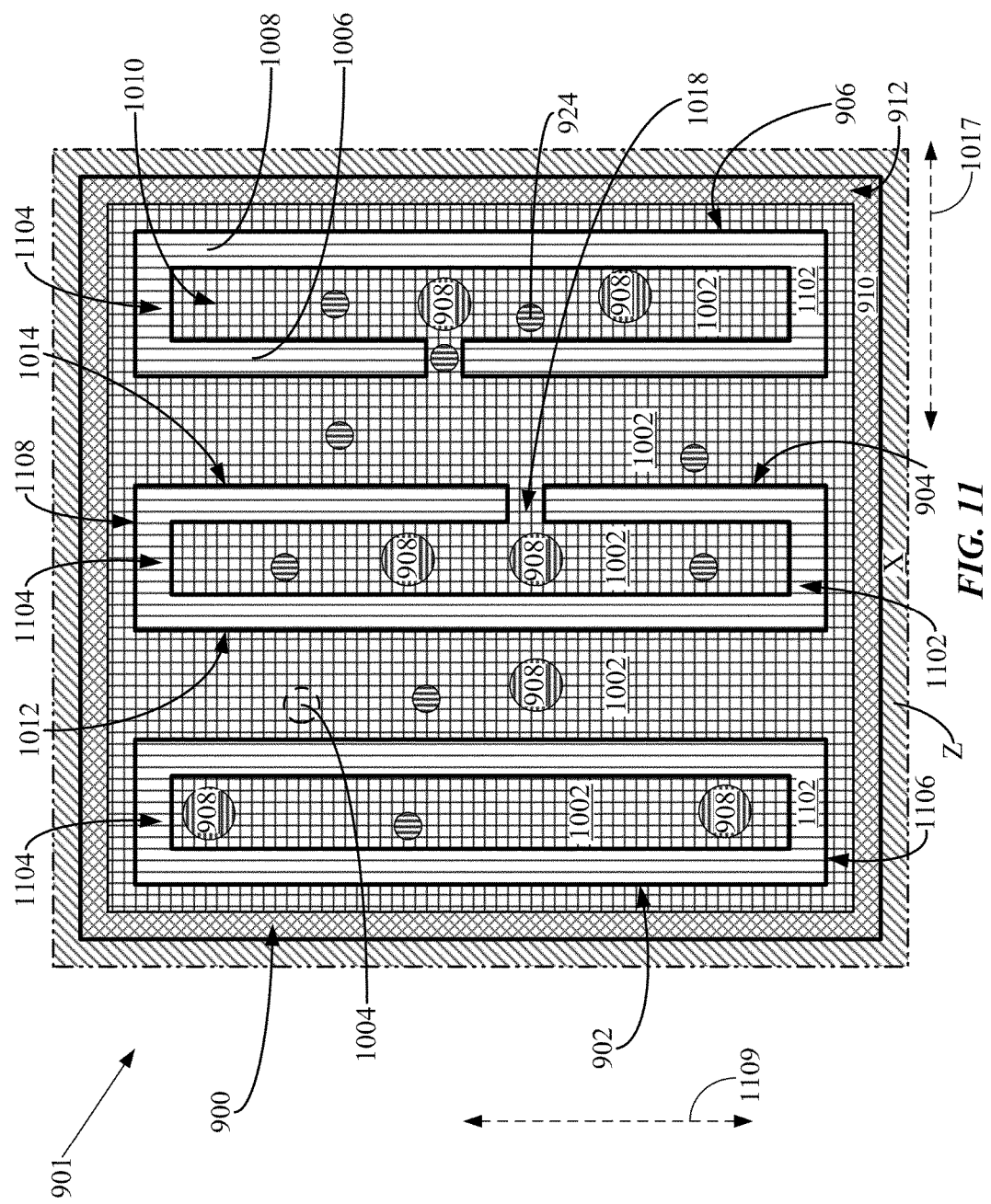
FIG. 11 is another cross-sectional view taken along line F-F of the device and system shown in FIG. 9.
Figure 12:
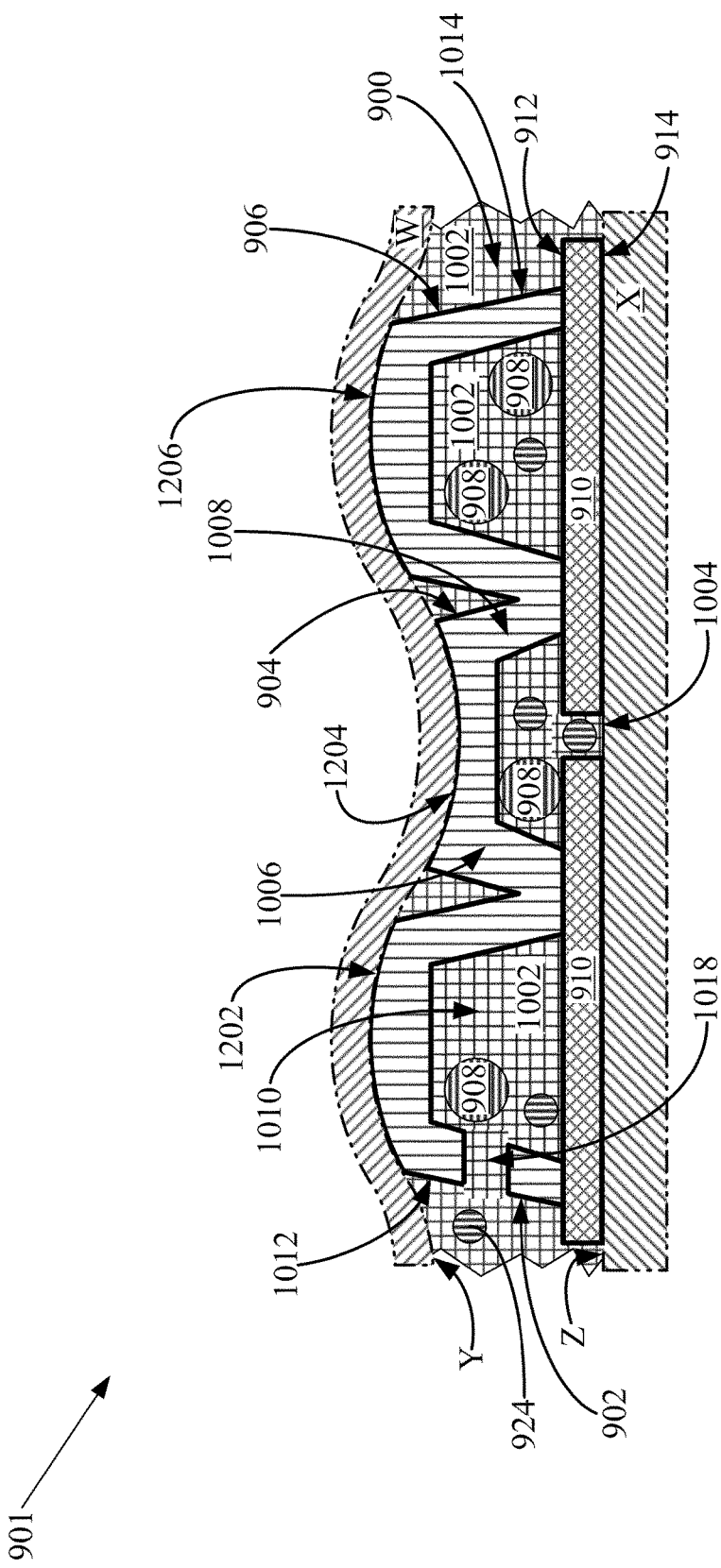
FIG. 12 is a further cross-sectional view taken along the line E-E of the device and system shown in FIG. 9.

FIG. 9 is a perspective view showing a further example of a device 900, and a system 901 into which the device 900 may be incorporated. FIG. 10 is a cross-sectional view taken along line E-E of the device 900 and system 901 shown in FIG. 9. FIG. 11 is another cross-sectional view taken along line F-F of the device 900 and system 901 shown in FIG. 9. FIG. 12 is a further cross-sectional view taken along the line E-E of the device 900 and system 901 shown in FIG. 9. The device 900 includes a plurality of enclosures 902, 904, 906. Each of the enclosures 902, 904, 906 encapsulates a matrix material 1002. A plurality of particles 908 are dispersed in the matrix material 1002.

The particles 908 are formed of a material itself having substantial bulk thermal conductivity of at least about 1 W/[mK] at a standardized measurement temperature of about 68° F. In an example, the particles 908 may be formed of a material that is a thermal conductor at a standardized measurement temperature of about 68° F. As another example, the matrix material 1002 having the particles 908 dispersed therein may have a substantial bulk thermal conductivity of at least about 1 W/[mK] at a standardized measurement temperature of about 68° F. In an example, the matrix material 1002 may itself have a bulk thermal conductivity of less than about 0.5 W/[mK] at a standardized measurement temperature of about 68° F. In a further example, the matrix material 1002 may itself have a bulk thermal conductivity of less than about 3 W/[mK] at a standardized measurement temperature of about 68° F. As an additional example, the particles 908 may be formed of a material itself having substantial bulk thermal conductivity of at least about 10 W/[mK] at a standardized measurement temperature of about 68° F. As another example, the particles 908 may be formed of a material itself having a bulk thermal conductivity that is at least about 0.5 W/[mK] greater than a bulk thermal conductivity of the matrix material 1002 itself, both bulk thermal conductivities being defined at a standardized measurement temperature of about 68° F.

The enclosures 902, 904, 906 are located on a base 910. The base 910 may have opposing first and second surfaces 912, 914. Further, the base 910 may have through-pores 1004 communicating between the opposing first and second surfaces 912, 914 of the base 910. In examples, the base 910 may be formed by a foam or mesh that also forms the through-pores 1004.

The device 900 may include any selected quantity of enclosures 902, 904, 906. The plurality of enclosures 902, 904, 906 may be arranged in an array located on the base 910. In the array, the plurality of enclosures 902, 904, 906 may be in mutual contact on the base 910 as shown, or may be (not shown) mutually spaced apart. In an example, the plurality of enclosures 902, 904, 906 as arranged in such an array may each have a pair of elongated walls 1006, 1008. A pair of elongated walls 1006, 1008 in each of the enclosures 902, 904, 906 may together define a trough forming a cavity 1010 with the base 910, the cavities 1010 containing the pluralities of the particles 908 dispersed in the matrix material 1002. Each of the enclosures 902, 904, 906 may have end walls 1102, 1104 that form corresponding exterior surfaces 1106, 1108. The matrix material 1002 may substantially fill the cavities 1010 meaning that any presence of air pockets within the cavities 1010 may be minimized.

Further, for example, the elongated walls 1006, 1008 may also form exterior surfaces 1012, 1014 together being also referred to as the first exterior surface of each of the enclosures 902, 904, 906. The second surface 914 of the base 910 is also referred to as the second exterior surface of each of the enclosures 902, 904, 906. The exterior surfaces 1012, 1014 of two mutually adjacent enclosures 902, 904, 906 may together define a channel 916 on the exterior surfaces 1012, 1014 of the enclosures 902, 904, 906. The device 900 may also include matrix material 1002 located in each of the channels 916. The matrix material 1002 so located may include a further plurality of particles 908 being formed of a material having substantial bulk thermal conductivity of at least about 1 W/[mK] at a standardized measurement temperature of about 68° F. In addition to the plurality of enclosures 902, 904, 906 being located on the first surface 912 of the base 910, the device 900 may further include (not shown) a plurality of enclosures 902, 904, 906 being located on the second surface 914 of the base 910. Alternatively, for example, the device 900 may include another base (not shown) being located on tips 918 of the enclosures 902, 904, 906.

The device 900 may be utilized, for example, by being placed in between a first object W and a second object X, as illustrated in phantom outline in FIG. 9 and in solid cross-section in FIGS. 10-12. It is understood that the shapes of the first and second objects W, X are merely examples of shapes of objects, and that the devices 900 may be utilized together with objects having other shapes. Tips 918 of the enclosures 902, 904, 906 may be positioned facing toward a contoured first surface Y of the first object W. Cavities 1010 formed by walls 1006, 1008 of the enclosures 902, 904, 906 may be positioned facing toward the first surface 912 of the base 910, with the second surface 914 of the base 910 being on and facing toward a contoured second surface Z of the second object X. It is understood that the contoured first and second surfaces Y, Z respectively of the first and second objects W, X are merely examples of contoured first and second surfaces, and that surfaces having other contours may be utilized. The first and second objects W and X may then be moved together in the directions of the arrows 920 and 922, causing the enclosures 902, 904, 906 to be deformed by compression between the surfaces Y, Z of the first and second objects W, X. Causing the enclosures 902, 904, 906 to be compressed in the directions of the arrows 920, 922 may cause the enclosures 902, 904, 906 to be expanded in the directions of the arrows 1017, 1109.

FIG. 12 shows that the exterior surfaces 1012, 1014 of the plurality of enclosures 902, 904, 906 in the device 900 are then deformed to form first exterior surfaces 1202, 1204, 1206 that conform with the contoured first surface Y of the first object W, and that the second surface 914 of the base 910 in the device 900 then conforms with the contoured second surface Z of the second object X. A thin layer (not shown) of the matrix material 1002 may be present between the contoured first surface Y and the exterior surfaces 1202, 1204, 1206, and another thin layer (not shown) of the matrix material 1002 may be present between the contoured second surface Z and the second surface 914 of the base 910. The enclosures 902, 904, 906 may be compressed to different degrees than shown in FIG. 12; and the compression may be uniform or non-uniform over each of the exterior surfaces 1012, 1014 of the enclosures 902, 904, 906 and over the second surface 914 of the base 910. The channels 916, where included in the device 900, may facilitate and guide flows of the matrix material 1002, and may facilitate mutual alignment among the particles 908.

The device 900 may provide substantial bulk thermal conductivity of at least about 1 W/[mK] at a standardized measurement temperature of about 68° F., as an interface between the surfaces Y, Z of the two objects W, X upon being compressed between and thereby being caused to conform with contours of the surfaces Y, Z of the two objects W, X. In an additional example, the device 900 may be incorporated into the system 901 including the first and second objects W, X and the enclosures 902, 904, 906.

The enclosures 902, 904, 906 are configured, upon deformation, to retain at least a portion of the plurality of the particles 908 within the enclosures 902, 904, 906 while allowing at least a portion of the matrix material 1002 to escape from the enclosures 902, 904, 906. In an example, a plurality of the particles 908 may be dispersed in the matrix material 1002 in each of the plurality of enclosures 902, 904, 906 at a first concentration, prior to deformation of the enclosures 902, 904, 906 by compression between the surfaces Y, Z of the first and second objects W, X. The enclosures 902, 904, 906 may then be so deformed, causing at least a portion of the matrix material 1002 to escape from some or all of the enclosures 902, 904, 906. Some or all of the enclosures 902, 904, 906 may then each contain an accordingly densified portion of the plurality of the particles 908 being dispersed at a second concentration, greater than the first concentration, in a remaining portion of the matrix material 1002.

The base 910 may be flexible or rigid, as examples. A base 910 formed of a wire mesh, for example, may conform to contours of the surfaces Y, Z of the two objects W, X yet may be dimensionally stable in directions of the arrows 1017, 1109.

One or more of the walls 1006, 1008, 1102, 1104 may have through-pores 1018 communicating between an interior of the enclosures 902, 904, 906 such as the cavity 1010, and an exterior surface 1012, 1014, 1106, 1108 respectively of the enclosures 902, 904, 906. In another example (not shown) the interior of an enclosure 902, 904, 906 may include a plurality of cavities defined by one or a plurality of interior walls. The through-pores 1018 may facilitate escape of the matrix material 1002 from the enclosures 902, 904, 906. The through-pores 1004 in the base 910 may also facilitate escape of the matrix material 1002 from the enclosures 902, 904, 906. The walls 1006, 1008, 1102, 1104 of the enclosures 902, 904, 906 may be formed, for example, by a foam or mesh that also forms the through-pores 1018. The particles 908 and the through-pores 1018 may have varying diameters, including multiple average diameters and multiple diameter ranges, in the same manner as earlier discussed in connection with the device 100. For example, the device 900 may include particles 924 being smaller than the particles 908. The device 900, the particles 908, 924 and the enclosures 902, 904, 906 may have similar dimensions and be formed of the same materials as earlier discussed in connection with analogous components of the device 100. The matrix material 1002 may formed of the same materials as earlier discussed in connection with analogous components of the device 100. The enclosures 902, 904, 906 included in the device 900 may have one or more dimensions being smaller than a dimension of one or both of the objects W, X, in the same manner as discussed with regard to the device 500.

The shapes of various components of the devices 100, 500, 900 may vary. For example, the enclosures 102, 502, 504, 506, 902, 904, 906 may have overall shapes being generally rhomboid, prismatic, cylindrical, polygonal, conical, pyramidal, or irregular. The enclosures 102, 502, 504, 506, 902, 904, 906 may be wire mesh balls, for example. The plurality of enclosures 102, 502, 504, 506, 902, 904, 906 may be arranged in a one-dimensional or two-dimensional (not shown) array located on a base 510, 910. In such arrays, the plurality of enclosures 102, 502, 504, 506, 902, 904, 906 may be in mutual contact on the base 510, 910, or may be mutually spaced apart. Various processes may be utilized for patterning and forming the enclosures 102, 502, 504, 506, 902, 904, 906, including, as examples, chemical lithography, photo-lithography, stamping, brazing, welding, metal powder printing, selective laser melting, selective laser sintering, direct metal laser sintering, high-volume print forming, investment casting, die casting, evaporation, chemical vapor deposition, and three-dimensional printing. Metal foils may be utilized for making portions of the enclosures 102, 502, 504, 506, 902, 904, 906. The particles 104, 116, 508, 530, 908, 924 may be formed by deposition and sintering of metal particles using laser-assisted welding. In an example, a device 900 may be fabricated by stamping a sheet of suitable material to form the elongated walls 1006, 1008, filling cavities 1010 formed by the elongated walls 1006, 1008 with particles 908 dispersed in matrix material 1002, and then assembling the stamped sheet together with a base 910 to form the enclosures 902, 904, 906. End walls 1102, 1104 may also be formed by the stamping or may be otherwise added. The teachings throughout this specification may be utilized in conjunction with the commonly-owned U.S. patent application titled "A Heat Transfer Structure", by Roger S. Kempers et al., Ser. No. 12/143,594, filed on Jun. 20, 2008, the entirety of which is hereby incorporated herein by reference. Where a device 100, 500, 900 includes a base 510, 910, the enclosures 102, 502, 504, 506, 902, 904, 906 may be integral with the base 510, 910 or may be mechanically or chemically or otherwise attached to the base 510, 910.

Figure 13:
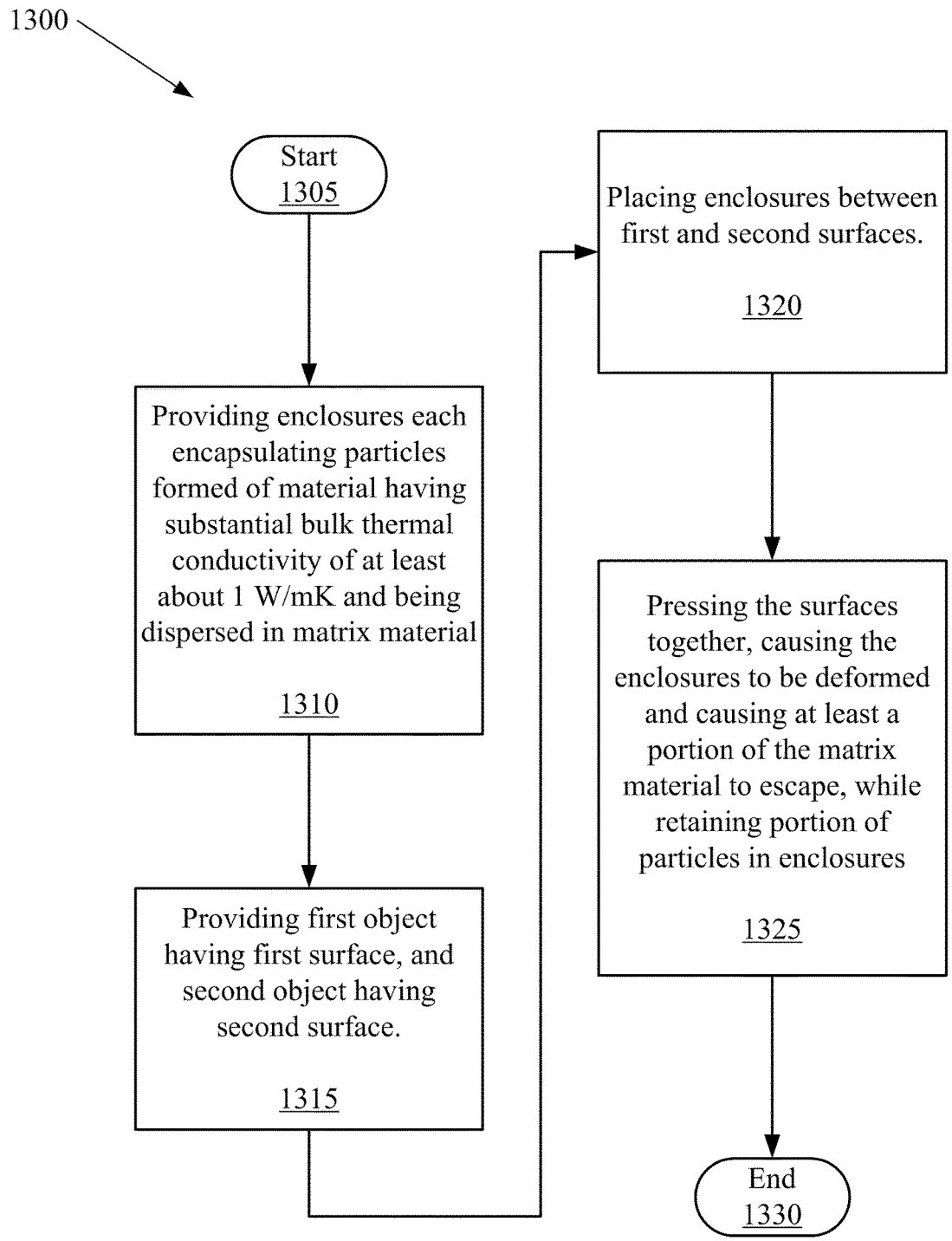
FIG. 13 is a flow chart showing an example of a method.

FIG. 13 is a flow chart showing an example of a method 1300. The method 1300 starts at step 1305, and then step 1310 includes providing one or more enclosures 102, 502, 504, 506, 902, 904, 906 each encapsulating a plurality of particles 104, 116, 508, 530, 908, 924 being formed of a material having substantial bulk thermal conductivity of at least about 1 W/[mK] at a standardized measurement temperature of about 68° F., and being dispersed in a matrix material 202, 602, 1002. Step 1315 includes providing a first object O, S, W having a first surface Q, U, Y and a second object P, T, X having a second surface R, V, Z. In step 1320, the enclosures 102, 502, 504, 506, 902, 904, 906 are placed between the first and second surfaces Q, R, U, V, Y, Z. At step 1325, the first and second surfaces Q, R, U, V, Y, Z are pressed together, causing the enclosures 102, 502, 504, 506, 902, 904, 906 to be deformed, thereby causing at least a portion of the matrix material 202, 602, 1002 to escape from the enclosures 102, 502, 504, 506, 902, 904, 906 while retaining at least a portion of the plurality of the particles 104, 116, 508, 530, 908, 924 within the enclosures 102, 502, 504, 506, 902, 904, 906. The method 1300 may then end at step 1330.

Step 1310 of the method 1300 may include providing one or more enclosures 102, 502, 504, 506, 902, 904, 906 as being included within any of the devices 100, 500, 900 or systems 101, 501, 901 earlier discussed. Step 1310 may include providing a plurality of particles 104, 116, 508, 530, 908, 924 being dispersed in a matrix material 202, 602, 1002 that includes a curable composition; and step 1325 may include causing the curable composition to be cured. Step 1325 may further include causing a concentration of the particles 104, 116, 508, 530, 908, 924 within the enclosures 102, 502, 504, 506, 902, 904, 906 to be increased. Step 1310 may include providing a plurality of particles 104, 116, 508, 530, 908, 924 including particles 104, 508, 908 having first diameters, and particles 116, 530, 924 having second diameters being smaller than the first diameters; and step 1325 may include causing a majority of the particles 104, 508, 908 to be retained within the enclosures 102, 502, 504, 506, 902, 904, 906 while allowing a portion of the particles 116, 530, 924 to escape from the enclosures 102, 502, 504, 506, 902, 904, 906. Step 1325 may include causing the enclosures 102, 502, 504, 506, 902, 904, 906 to conform with contours on the surfaces Q, R, U, V, Y, Z of the objects O, P, S, T, W, X while providing substantial bulk thermal conductivity of at least about 1 W/[mK] at a standardized measurement temperature of about 68° F. between the surfaces Q, R, U, V, Y, Z of the two objects O, P, S, T, W, X. Step 1310 may include providing an array of enclosures 102, 502, 504, 506, 902, 904, 906 being located on a base 510, 910, the array forming channels 518, 916 between the enclosures 102, 502, 504, 506, 902, 904, 906 on the base 510, 910; and step 1325 may include causing at least a portion of the matrix material 202, 602, 1002 to escape from the enclosures 102, 502, 504, 506, 902, 904, 906 and to flow in the channels 518, 916.

It is understood that each of the features of the various examples of devices 100, 500, 900 may be included in or excluded from a particular device 100, 500, 900 or system 101, 501, 901 as selected for a given end-use application, consistent with the teachings herein. It is further understood that the various examples of each of the devices 500, 900 illustrate analogous examples of variations of the devices 100. Accordingly, the entire discussion of the devices 100 is deemed incorporated into the discussion of the devices 500, 900; the entire discussion of the devices 500 is deemed incorporated into the discussion of the devices 100, 900; and the entire discussion of the devices 900 is deemed incorporated into the discussion of the devices 100, 500. Likewise, it is understood that the various examples of the method 1300 illustrate analogous examples of variations of the devices 100, 500, 900 and of the systems 101, 501, 901. Accordingly, the entire discussions of the devices 100, 500, 900 and systems 101, 501, 901 are deemed incorporated into the discussion of the method 1300; and the entire discussion of the method 1300 is deemed incorporated into the discussions of each of the devices 100, 500 900.

The devices 100, 500, 900 may be utilized in replacement of a conventional thermal interface material ("TIM"). For example, the devices 100, 500, 900 may be utilized in end-use applications where transfer of thermal energy, such as waste- or excessive-heat, from a first thermal energy-producing object O, S, W into a second thermal energy-receiving or thermal energy-dissipating object P, T, X may be needed. A device 100, 500, 900 may be placed in between a first object O, S, W that generates thermal energy, and a second object P, T, X being provided to receive or dissipate thermal energy from the first object O, S, W. A system 101, 501, 901 is thereby formed. The device 100, 500, 900 may then serve as a thermal interface between the first and second objects O, P, S, T, W, X, functioning to more efficiently transfer the thermal energy from the first object O, S, W to the second object P, T, X than achievable by direct contact between the first and second objects O, P, S, T, W, X. The first object O, S, W may be an apparatus that generates thermal energy that may damage or destroy the apparatus or degrade its performance where that thermal energy is not removed. Such an apparatus may include, as examples, a microelectronic device such as a semiconductor chip die, a multi-chip module, a microprocessor, an integrated circuit, a circuit pack or other component forming part of a core Internet Protocol ("IP") router, or another electronic device. The devices 100, 500, 900 may also be utilized to cool or to protect a first object O, S, W being an apparatus that is exposed to thermal energy from an external source. The second thermal energy-dissipating object P, T, X may be, as examples, a heat sink, a heat spreader, a vapor chamber, or a heat pipe. Other configurations of devices 100, 500, 900 and of the corresponding systems 101, 501, 901 may be utilized consistent with the teachings herein. Likewise, the method 1300 may include additional steps and modifications of the indicated steps.

Moreover, it will be understood that the foregoing description of numerous examples has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

What is claimed is:

1. A device, comprising:
   an enclosure;
   a matrix material;
   a plurality of particles formed of a material having substantial bulk thermal conductivity of at least one watt per meter-Kelvin (1 W/[mK]) at a standardized measurement temperature of about 68° F.;
   the plurality of particles being dispersed in the matrix material and being encapsulated in the enclosure;
   wherein the enclosure has through-pores communicating between an interior of the enclosure and an exterior of the enclosure; and
   wherein at least a portion of the plurality of particles have diameters being larger than a maximum diameter of the through-pores.

2. The device of claim 1, wherein upon deformation, the enclosure is configured to allow a portion of the matrix material to escape from the enclosure while retaining at least a portion of the plurality of particles within the enclosure.

3. The device of claim 1, wherein the enclosure has a wall defining a cavity encapsulating the plurality of particles dispersed in the matrix material.

4. The device of claim 3, wherein the wall is formed by a foam or mesh.

5. The device of claim 3, wherein the wall is formed of a material having substantial bulk thermal conductivity of at least 1 W/[mK] at a standardized measurement temperature of about 68° F.

6. The device of claim 3, wherein a portion of the wall is configured for conforming to a contour of an object upon contact under pressure between the wall and the object.

7. The device of claim 1, wherein the matrix material includes a curable composition.

8. The device of claim 1, wherein the plurality of particles includes first particles having first diameters and second particles having second diameters being smaller than the first diameters, and wherein upon deformation, the enclosure is configured to allow a portion of the second particles to escape from the enclosure while retaining a majority of the first particles within the enclosure.

9. The device of claim 1, wherein the enclosure is configured for conforming to a contour of an object upon contact under pressure between the enclosure and the object.

10. The device of claim 1, including another enclosure, the another enclosure encapsulating another plurality of particles formed of a material having substantial bulk thermal conductivity of at least 1 W/[mK] at a standardized measurement temperature of about 68° F. and dispersed in the matrix material, the another enclosure having through-pores communicating between an interior of the another enclosure and an exterior of the another enclosure and at least a portion of the another plurality of particles having diameters being larger than a maximum diameter of the through-pores of the another enclosure; the device further including a base; the enclosure and the another enclosure both being located on the base.

11. The device of claim 10, wherein the base has opposing first and second surfaces, and through-pores communicating between the opposing first and second surfaces.

12. The device of claim 10, wherein the base is formed by a foam or mesh.

13. The device of claim 10, including an array of enclosures each being located on the base, each enclosure having encapsulated therein a plurality of particles formed of a material having substantial bulk thermal conductivity of at least 1 W/[mK] at a standardized measurement temperature of about 68° F. and being dispersed in the matrix material, each one of the array of the enclosures having through-pores communicating between an interior of the one of the enclosures and an exterior of the enclosure and at least a portion of the plurality of particles of the enclosure having diameters being larger than a maximum diameter of the through-pores of the enclosure.

14. The device of claim 13, wherein the array of enclosures includes a plurality of enclosures being mutually spaced apart on the base, and wherein the plurality of enclosures forms channels there-between on the base.

15. The device of claim 10, wherein the enclosure and the another enclosure are mutually spaced apart on the base and form a channel there-between, and wherein the device is configured upon deformation to allow a portion of the matrix material to escape from the enclosure and from the another enclosure and to flow in the channel.

16. The device of claim 15, wherein the enclosure has through-pores communicating between an interior of the enclosure and the channel.

17. A system, comprising:
an enclosure having first and second exterior surfaces and encapsulating a plurality of particles formed of a material having substantial bulk thermal conductivity of at least one watt per meter-Kelvin (1 W/[mK]) at a standardized measurement temperature of about 68° F. and being dispersed in a matrix material; and
a first object having a first object surface and a second object having a second object surface, the enclosure being located between the objects with the first exterior surface of the enclosure facing toward the first object surface and with the second exterior surface of the enclosure facing toward the second object surface;
wherein the enclosure has through-pores communicating between an interior of the enclosure and an exterior of the enclosure, at least a portion of the plurality of particles having diameters being larger than a maximum diameter of the through-pores.

18. The system of claim 17, wherein the first object surface has a first contour, and wherein the first exterior surface of the enclosure conforms with the first contour.

19. The system of claim 17, wherein the first exterior surface of the enclosure is configured upon deformation to conform with the first object surface; and wherein the second exterior surface of the enclosure is configured upon deformation to conform with the second object surface.

20. The system of claim 17 including another enclosure, the another enclosure encapsulating another plurality of particles formed of a material having substantial bulk thermal conductivity of at least 1 W/[mK] at a standardized measurement temperature of about 68° F. and being dispersed in the matrix material, the another enclosure having through-pores communicating between an interior of the another enclosure and an exterior of the another enclosure and at least a portion of the another plurality of particles having diameters being larger than a maximum diameter of the through-pores of the another enclosure; the system further including a base that has opposing first and second surfaces; the enclosure and the another enclosure both being located on the first surface of the base; and the second surface of the base being located on the second object surface.

21. The system of claim 20, wherein the base includes through-pores communicating between the opposing first and second surfaces.

22. The system of claim 20, including an array of enclosures each located on the first surface of the base, each enclosure having encapsulated therein a plurality of particles formed of a material having substantial bulk thermal conductivity of at least 1 W/[mK] at a standardized measurement temperature of about 68° F. and being dispersed in the matrix material, each one of the array of the enclosures having through-pores communicating between an interior of the one of the enclosures and an exterior of the enclosure and at least a portion of the plurality of particles of the enclosure having diameters being larger than a maximum diameter of the through-pores of the enclosure.

23. The system of claim 22, wherein the array of enclosures includes a plurality of enclosures being mutually spaced apart on the base, and wherein the plurality of enclosures forms channels there-between on the first surface of the base.

24. The system of claim 20, wherein the enclosure and the another enclosure are mutually spaced apart on the base and form a channel there-between, and wherein the system is configured upon deformation to allow a portion of the matrix material to escape from the enclosure and from the another enclosure and to flow in the channel.

25. The system of claim 24, wherein the matrix material includes a curable composition.

26. The system of claim 17, wherein the matrix material includes a curable composition.

27. The system of claim 17, wherein the enclosure has a wall defining a cavity encapsulating the plurality of particles dispersed in the matrix material.

28. The system of claim 27, wherein the wall is formed by a foam or mesh.

29. The system of claim 27, wherein the wall is formed of a material having substantial bulk thermal conductivity of at least 1 W/[mK] at a standardized measurement temperature of about 68° F.

30. A method, comprising:
providing an enclosure encapsulating a plurality of particles formed of a material having substantial bulk thermal conductivity of at least one watt per meter-Kelvin (1 W/[mK]) at a standardized measurement temperature of about 68° F. and being dispersed in a matrix material, the enclosure having through-pores communicating between an interior of the enclosure and an exterior of the enclosure and at least a portion of the plurality of particles having diameters being larger than a maximum diameter of the through-pores;
providing a first object having a first surface and a second object having a second surface;
placing the enclosure between the first and second surfaces;
pressing the first and second surfaces together, causing the enclosure to be deformed, thereby causing at least a portion of the matrix material to escape from the enclosure while retaining at least a portion of the plurality of particles within the enclosure.

31. The method of claim 30, wherein providing the enclosure includes providing the plurality of particles being dispersed in a matrix material that includes a curable composition; and wherein pressing the first and second surfaces together includes causing the composition to be cured.

32. The method of claim 30, wherein pressing the first and second surfaces together includes causing a concentration of the particles within the enclosure to be increased.

33. The method of claim 30, wherein providing the enclosure includes providing the plurality of particles as including first particles having first diameters and second particles having second diameters being smaller than the first diameters; and wherein pressing the first and second surfaces together includes causing a majority of the first particles to be retained within the enclosure while allowing a portion of the second particles to escape from the enclosure.

34. The method of claim 30, wherein pressing the first and second surfaces together includes causing the enclosure to conform with contours on the first and second surfaces of the two objects while providing substantial bulk thermal conductivity of at least 1 W/[mK] at a standardized measurement temperature of about 68° F. between the first and second surfaces.

35. The method of claim 30, wherein providing the enclosure includes providing another enclosure, the another enclosure encapsulating another plurality of particles formed of a material having substantial bulk thermal conductivity of at least 1 W/[mK] at a standardized measurement temperature of about 68° F. and dispersed in the matrix material, the another enclosure having through-pores communicating between an interior of the another enclosure and an exterior of the another enclosure and at least a portion of the another plurality of particles having diameters being larger than a maximum diameter of the through-pores of the another enclosure; and wherein providing the enclosure includes providing a base; and wherein the enclosure and the another enclosure are both located on the base.

36. The method of claim 35, wherein providing the enclosure includes providing an array of enclosures each being located on the base, each enclosure having encapsulated therein a plurality of particles formed of a material having substantial bulk thermal conductivity of at least 1 W/[mK] at a standardized measurement temperature of about 68° F. and being dispersed in the matrix material, each one of the array of the enclosures having through-pores communicating between an interior of the one of the enclosures and an exterior of the enclosure and at least a portion of the plurality of particles of the enclosure having diameters being larger than a maximum diameter of the through-pores of the enclosure, the array forming channels between the enclosures on the base; and wherein pressing the first and second surfaces together includes causing at least a portion of the matrix material to escape from the enclosures and to flow in the channels.

* * * * *